US006830340B2

(12) United States Patent
Olson et al.

(10) Patent No.: US 6,830,340 B2
(45) Date of Patent: Dec. 14, 2004

(54) IMAGE-RENDERING DEVICE

(75) Inventors: Jorell A. Olson, Portland, OR (US); Robin Hoeye, Tigard, OR (US); Jason Lewis, Keizer, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/033,474

(22) Filed: Dec. 26, 2001

(65) Prior Publication Data

US 2003/0117587 A1 Jun. 26, 2003

(51) Int. Cl.[7] .......................... G03B 21/26; G03B 21/00; H04N 9/31
(52) U.S. Cl. .......................... 353/30; 353/122; 348/744
(58) Field of Search ............................. 353/30, 31, 122; 348/744, 211, 212, 213

(56) References Cited

U.S. PATENT DOCUMENTS 6,137,794 A * 10/2000 Brown ........................ 370/360
6,489,934 B1    12/2002 Klausner ..................... 345/1.1
6,522,352 B1 *  2/2003 Strandwitz et al. ..... 348/211.12
2001/0003479 A1 * 6/2001 Fujiwara ...................... 353/122
2002/0196378 A1 * 12/2002 Slobodin et al. ............ 348/744
2003/0053033 A1 * 3/2003 Vrachan et al. ............... 353/31

* cited by examiner

Primary Examiner—Russell Adams
Assistant Examiner—Melissa J Koval

(57) ABSTRACT

The present invention provides an image-rendering device for an image projector. The image-rendering device includes a body having an image receiver adapted to alternatively receive a first interchangeable data transfer device and a second interchangeable data transfer device. Each interchangeable data transfer device is adapted to enable transfer of an image to the image-rendering device. The body may further include a projector connector adapted to operably couple the image-rendering device to the image projector and a processor configured to automatically transmit the image from the image receiver to the image projector for display. In some embodiments, the image-rendering device includes a peripheral device connector configured to enable at least one peripheral device to be operably linked to the image-rendering device. The peripheral device connector may be configured to transmit an image from the at least one peripheral device to the image projector, or vice versa.

39 Claims, 4 Drawing Sheets

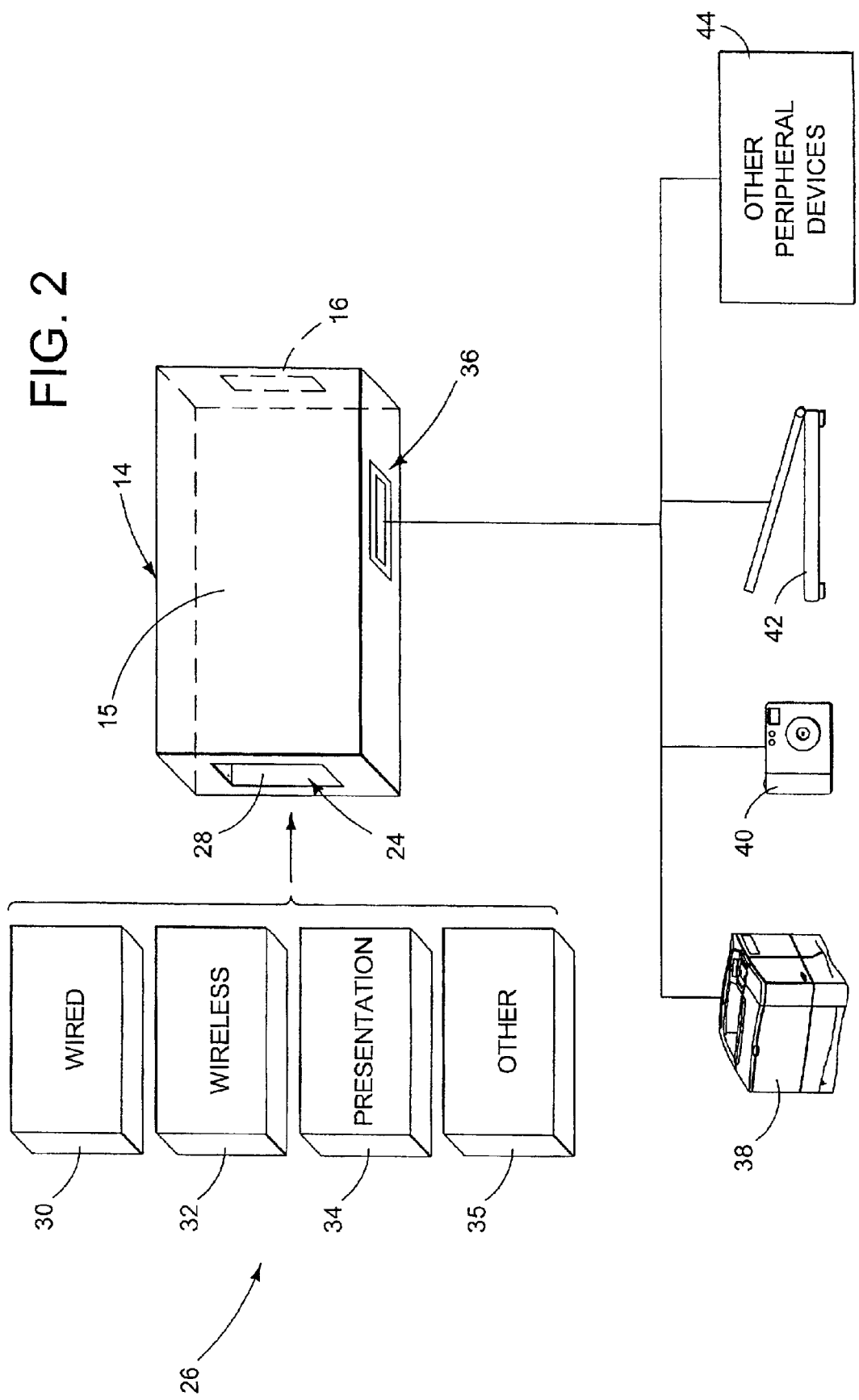

IMAGE-RENDERING DEVICE

TECHNICAL FIELD

The present invention relates generally to image projectors, and more particularly to an image-rendering device that is capable of transmitting an image from a plurality of independent sources to an image projector.

BACKGROUND OF THE INVENTION

Image projectors have become a popular method to present a presentation to an audience and are used for both personal and business purposes. These image projectors typically are used to project a computer image and/or presentation onto a viewing surface.

Some image projectors are configured to enable a user to access a presentation by coupling their computer to the projector. Typically, a user must physically connect their computer, such as a personal computer, to the image projector. This process may be cumbersome and frustrating to a presenter. For example, there may be compatibility issues between the hardware and software on the computer and on the image projector. Moreover, connection to the image projector may require numerous cables and/or adapters to enable connection of the user's computer with the available projector. It is not unusual for the cables and adapters to get lost or become misplaced.

Thus, it may be difficult for multiple presenters to use the same projector. For example, when transitioning from a first presenter to a second presenter, the first presenter must physically connect a computer to an image projector using the appropriate adapters and cables. The first presenter then typically seats himself or herself close to the image projector. When the second presenter wants to present their presentation, the first presenter may have to disconnect the computer from the image projector, enabling the second presenter to connect a new computer to the image projector possibly using different adapters and cables. Typically, the first presenter may have to change seats with the second presenter to provide room for the second presenter to connect to the image projector. This transition between the first and second presenter may take a significant period of time and be disruptive to a meeting.

What is needed is a portable and easy-to-use device that enables multiple users to easily connect to an image projector, regardless of the computing platform used by the user or the storage location or format of the presentation. Moreover, it would be useful if a presenter could run a presentation from anywhere in a room. Furthermore, it would be useful if the device enabled other peripheral devices, such as printers, scanners, cameras, etc. to be easily connected to the image projector.

SUMMARY OF THE INVENTION

The present invention provides an image-rendering device for an image projector. In one embodiment of the present invention, the image-rendering device includes a body having an image receiver adapted to alternatively receive a first interchangeable data transfer device and a second interchangeable data transfer device. Each interchangeable data transfer device is adapted to enable transfer of an image. The body may further include a projector connector adapted to operably couple the image-rendering device to the image projector and a processor configured to automatically transmit the image from the image receiver to the image projector for display.

In some embodiments, the image-rendering device includes a peripheral device connector configured to enable at least one peripheral device to be operably linked to the image-rendering device. The peripheral device connector may be configured to transmit an image from the at least one peripheral device to the image projector, and/or vice versa.

In another embodiment of the present invention, a portable image-rendering device includes a wireless receiver and a projector connector adapted to directly couple the image-rendering device to an image projector. The wireless receiver is adapted to link the image-rendering device to a wireless network. The wireless receiver is further adapted to receive an image from any one of a plurality of computers linked to the wireless network. The image-rendering device is further adapted to automatically transfer the image from the wireless receiver to an image projector for display.

In still another embodiment, a portable image-rendering device includes a peripheral device connector configured to enable at least one peripheral device to be operably linked to the image-rendering device. The peripheral device connector may be configured to transmit an image from the at least one peripheral device to the image projector, or vice versa.

BRIEF DESCRIPTION OF THE DRAWINGS

FIG. 2 is a schematic diagram of the image-rendering device of FIG. 1.

DETAILED DESCRIPTION OF THE PREFERRED EMBODIMENTS

Figure 1:
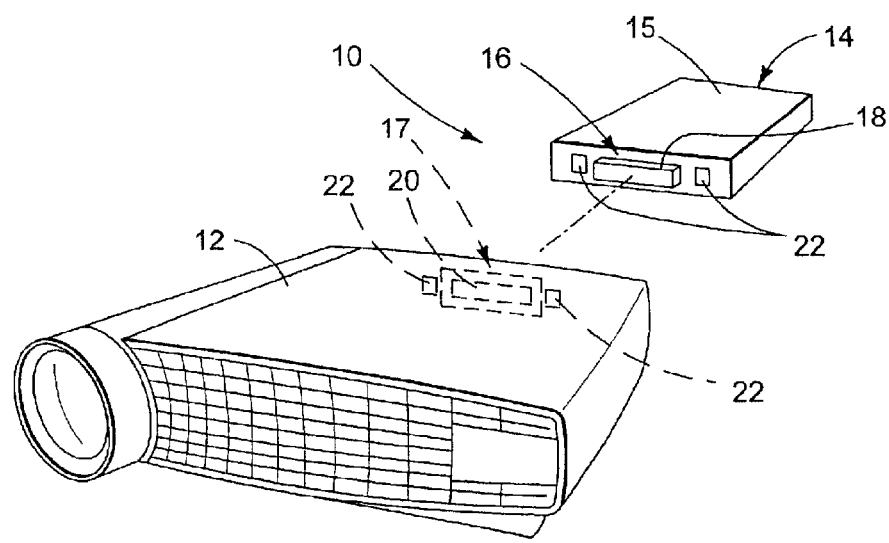
FIG. 1 is an exploded isometric view of an image projector and an image-rendering device according to one embodiment of the present invention.

Referring initially to FIG. 1, an image display system is shown generally at 10. Image display system 10 typically includes an image projector or visual presentation projector 12 and an image-rendering or image-transformation device 14. Briefly, image-rendering device 14 is operably coupled to image projector 12, such that images are transferred from image-rendering device 14 to image projector 12 for presentation on a projection or viewing surface. Image-rendering device 14 is adapted to receive images from a plurality of different sources and is further adapted to automatically transmit a projectable image to image projector 12.

Image projector 12 may be any suitable display device, including, but not limited to, liquid crystal display (LCD) projectors, digital light processing (DPL) projectors, etc.

Image-rendering device 14 includes a body 15. Body 15 is configured to be selectively inserted at least partially within an attachment slot 17 in image projector 12. Specifically, body 15 includes a projector connecter 16. Projector connector 16 functions to couple image-rendering device 14 to image projector 12. Projector connector 16 further functions to transmit or transfer a projectable image to image projector 12. As illustrated in FIG. 1, projector connector 16 may include a plug 18 that is adapted to be received into a corresponding outlet 20 in image projector 12, permitting image-rendering device 14 to directly engage or plug into image projector 12. Attachment structures, including latches 22, projections, pins, tabs, braces, screws or other suitable supports, may be used to retain image-rendering device 14 within outlet 20. Alternatively, instead of an integral connector, projector connector 16 may be attached to projector 12 in a remote fashion via a cable and suitable plug.

Any suitable plug may be implemented in the present invention. One example of a suitable projector connector is a standard video plug. Use of a standard video plug may enable image-rendering device 14 to be used on a variety of image projectors having a standard outlet. For example, projector connector 16 may be a Video Electronics Standard Association (VESA) M1 plug that corresponds to an M1 standard video interface, which is available on numerous image projectors. For example, the M1 plug may be any display receptacle interface, such as, but not limited to, a digital connector, e.g. an M1-D connector, an analog connector, e.g. an M1-A connector, or a digital and analog connector, e.g. an M1-DA connector.

Image-rendering device 14 may utilize any suitable power supply. For example, projector connector 16 may include a power supply enabling image-rendering device 14 to draw power from connector 16. An example of such a projector connector is the VESA M1 plug described above. Furthermore, projector connector 16 may be capable of supporting both analog and digital display requirements.

Turning now to FIG. 2, image-rendering device 14 may be understood in more detail. Specifically, body 15 of image-rendering device 14 may include at least one image receiver 24 configured to receive a plurality of different data transfer devices 26, examples of which are depicted at 30, 32, 34 and 35. Each data transfer device is adapted to provide an image, presentation, slide or other type of data to be transferred to image-rendering device 14 from an independent source, e.g. an external computer or a mass storage device. An external computer, as discussed in more detail below, includes any suitable computing device, including, but not limited to, a personal computer, a desktop computer, a laptop computer, a handheld computer, etc.

Data transfer devices 26 enable image-rendering device 14 to receive images from multiple sources. Data transfer device 26 may be a card, an expansion board, an adapter or other suitable device that is adapted to be plugged into a slot 28 within image-rendering device 14. It should be noted that slot 28 is configured to enable different cards to be quickly and easily inserted and removed from image-rendering device 14. Slot 28 may be of a suitable size, such that standard-sized cards may be inserted, or adapted to be inserted, into slot 28.

Any number of different data transfer devices 26 may be interchangeably received within slot 28. For example, data transfer device 26 may be a network interface card, such as a wired network card, indicated schematically at 30, or a wireless network card, indicated schematically at 32. Specifically, wired network card 30 may include an IEEE 802.3 standard wired local area network (LAN) interface card, e.g. Ethernet, 100BASE-T standard (IEEE 802.3u) or fast Ethernet, IEEE 802.3z or gigabit Ethernet, and/or other suitable wired network interface. Wireless network card 32 may include a wireless LAN card, such as IEEE 802.11a, 802.11b, 802.11g, 802.11x, a radio card, a Bluetooth radio card, a ZigBee radio, etc.

Each network interface card, regardless of type, enables communication between device 14 and an independent source, e.g. a remote computer, server, network, etc. This communication allows an image or presentation stored on the independent source to be transmitted to image-rendering device 14. Examples of specific implementations of different network interface cards within image-rendering device 14 are described in more detail following the description of FIGS. 2 and 3.

Slot 28 may also be configured to accept other types of data transfer devices. For example, data transfer device 26 may be a presentation card, indicated schematically at 34. Presentation card 34 may be any suitable type of mass storage device. For example, presentation card 34 may be a memory card, a flash memory card, a solid-state memory card, a hard-disk, etc. A user may insert a presentation card having a prestored presentation into image receiver 24. The prestored image may then be automatically transferred to image projector 12. Alternatively, a user may be able to navigate a menu displayed on the viewing surface in order to select a presentation. Such a configuration may be especially helpful if more than one presentation is stored on the presentation card.

Software may be provided within image-rendering device 14 to enable the device to convert and render prestored images into projectable images. For example, software may be provided in the device to enable a prestored presentation to be presented with dynamic graphics and other animations. Specifically, presentations may be stored in a primitive graphical format and/or in a compressed format and decompressed or otherwise rendered by image-rendering device 14 into a projectable image.

A further application for use of a presentation card within image-rendering device 14 may be best illustrated with reference to a standard digital camera. Typically, standard digital cameras include some type of memory device, such as a non-volatile memory card, or other mass storage device, that stores digital pictures. Image receiver 24 may be configured to receive such a memory device such that the pictures stored in the memory card and/or mass storage device may be presented by image projector 12. Furthermore, image-rendering device 14 may be configured to render the images from the memory card to simulate a slide show. Additionally, it should be noted that a user may be able to order, animate, insert transitions and/or otherwise alter the pictures when presenting the slide show.

Image-rendering device 14 further may include at least one peripheral device connector 36 on body 15. Peripheral device connector 36 is configured to enable at least one peripheral device to be operably linked to image-rendering device 14 to enable images to be transferred from a peripheral device to image projector 12 or vice versa. Peripheral connector 36 may be any suitable connector. For example, peripheral connector 36 may be a standard connector, such as a Universal Serial Bus (USB) port, IEEE 1394 port, parallel port, e.g. enhanced parallel port (EPP), extended capabilities port (ECP), etc. It should be noted that more than one peripheral connector may be provided on body 15.

As illustrated, any number of peripheral devices may be coupled to image-rendering device 14 via peripheral connector 36. Exemplary peripheral devices may include, but are not limited to, printers 38, cameras 40, scanners or document cameras 42 and other peripheral devices 44. As discussed above, images may be transferred from any one of the peripheral devices to image projector 12 or vice versa. In this manner, scanned images may be transferred to image-rendering device 14 and projected onto an image projection surface via image projector 12. Similarly, pictures residing within camera 40 may be transmitted directly from the camera to image projector 12 and projected onto an image projection surface. Additionally, a projected image or presentation may be relayed back through image-rendering device 14 and printed by printer 38.

Figure 3:
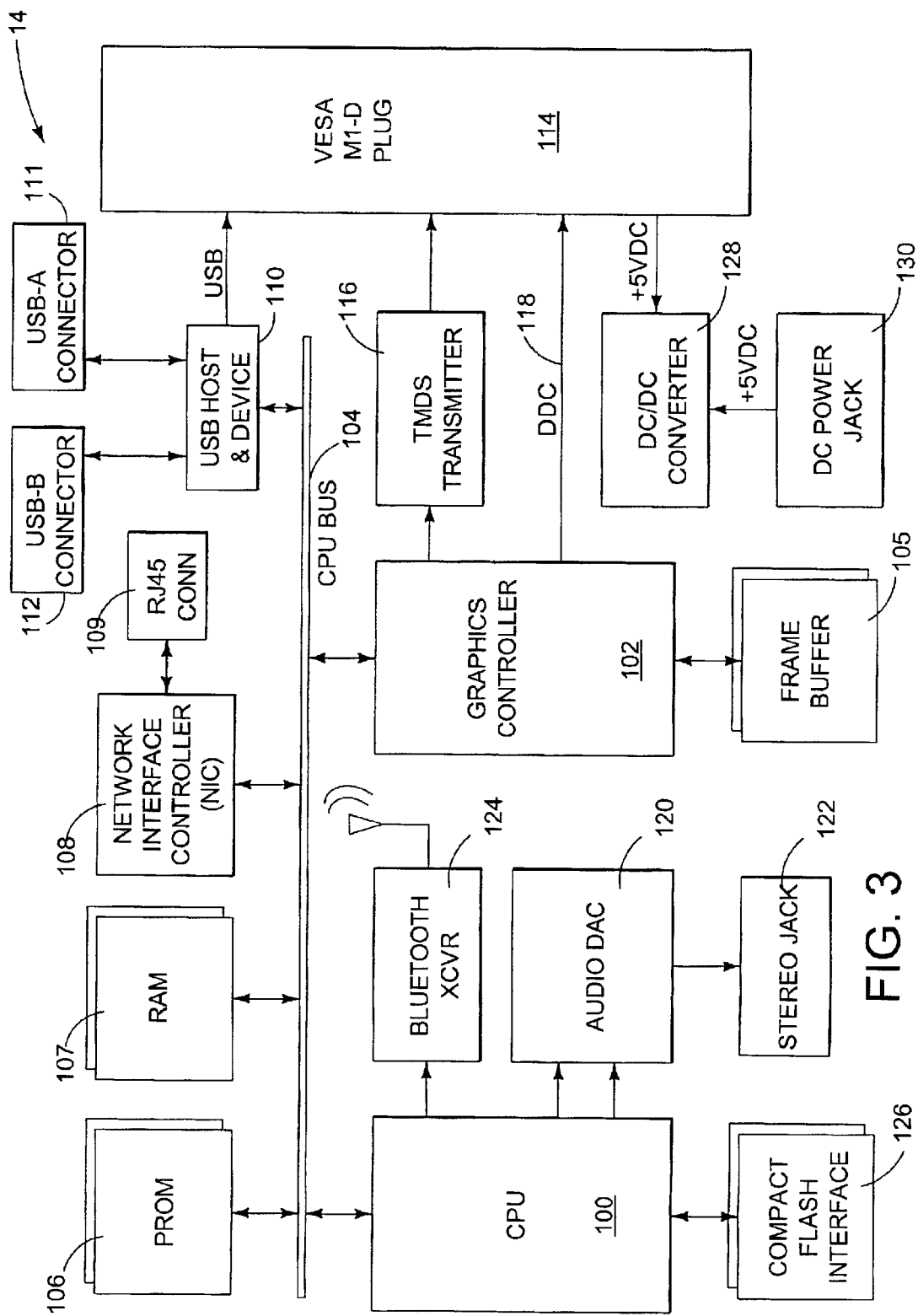
FIG. 3 is an exemplary block diagram of the image-rendering device of FIG. 2.

FIG. 3 illustrates a block diagram of an exemplary electrical and logic system for one embodiment of the present invention. It should be noted that this diagram is for illustrative purposes and is not intended to limit the scope of the invention. Specifically, image-rendering device 14 includes a central processing unit (CPU) or processor 100 configured to automatically transmit images from the image receiver and/or the peripheral connector to the image projector for display. Transmitting the images may include rendering and/or decompressing images depending on the format of a received image.

Processor 100 is connected to a graphics controller 102 via a bus 104. Graphics controller 102 is adapted to process and produce images that may be projected by image projector 12. Buffer 105 is linked directly to graphics controller 102 and provides temporary memory for graphics controller 102. Image-rendering device 14 further includes memory, such as programmable read-only memory (PROM) 106 and random access memory (RAM) 107, linked to processor 100 and graphics controller 102 by bus 104. Other types of memory may also be utilized.

Peripherals, including a network interface card 108 (including connector 109) and USB host 110, are further linked to processor 100 and graphics controller 102 by the same bus 104. USB host 110 may be linked to USB-A connector 111 and/or USB-B connector 112 and may be further linked directly to the M1-D plug 114. It should further be noted, that graphic controller 102 may be linked to M1-D plug 114 via an analog interface and/or a transition minimized differential signaling (TMDS) transmitter 116. Graphic controller 102 is further linked to M1-D plug 114 via a display data channel 118.

Additionally, an audio converter is illustrated at 120 with attached stereo jack 122 to allow audio output through external speakers and/or internal speakers. Provision is made for accommodation of a Bluetooth radio card via a Bluetooth transceiver 124. A compact flash interface 126 is also provided to allow a compact flash card or other data transfer device, such as 30, 32, 34 and 35 shown in FIG. 2, to be inserted and used within slot 28.

As described above, image-rendering device 14 may be powered from the VESA M1 interface from the image projector via M1-D plug 114 or other similar device. A power converter 128 may be further utilized within the system. Alternatively, power may be provided via power jack 130.

Figure 4:
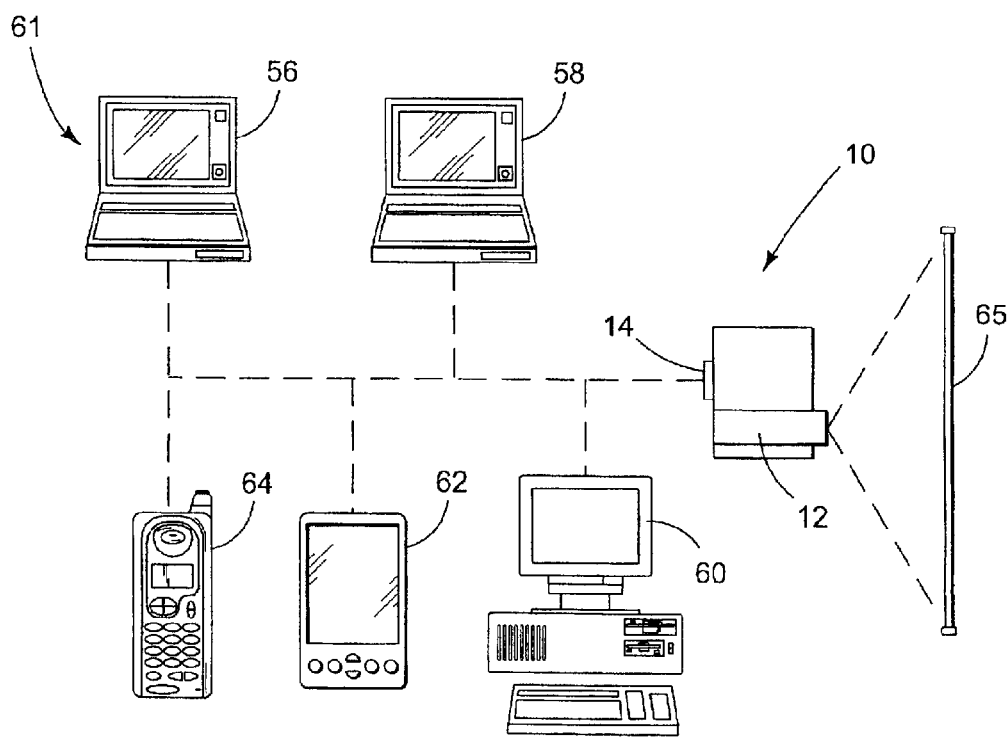
FIG. 4 is a graphical representation of an exemplary use environment in which an embodiment of the present invention may be implemented.

FIG. 4 illustrates an exemplary use environment in which image-rendering device 14 may be implemented. Specifically, image-rendering device 14 is shown in a network environment 61. Network environment 61 may include a plurality of different devices, such as computers, laptops, servers, handheld computers, etc. The insertion of an appropriate network card into image-rendering device 14 enables presentation content on each of the network devices to be selectively transmitted to image-rendering device 14 for display by image projector 12. As shown, image projector 12 may display the transferred image onto a display surface 65.

As described above, the network interface card may be either a wireless network card or a wired network card. A wireless network card 32, as shown in FIG. 2, may be adapted to be selectively received and removed from slot 28. It should further be appreciated that wireless network card 32 may be permanently integrated within image-rendering device 14 without departing from the scope of the invention. Wireless network card 32 enables a plurality of users to alternatively link to the local area network and send images/presentations to an image projector without individually having to manually couple their computer to a projector. Additionally, as long as a user's computer device is capable of linking to the local area network using standard protocols and transferring data, the type and model of the computer linked to device 14 is irrelevant. No adapters or cables are necessary for the wireless connection. Thus, users may be able to present from any location in a room.

Such a system is particularly useful in meeting room environments, where multiple individuals using the same projector system for presentations may be using different operating systems and/or platforms. For example, in FIG. 4, five computers, two portable computers or laptops 56 and 58, a desktop computer 60, a handheld computer 62, and a telephone 64, are shown linked to device 14 over a wireless LAN. Any of the users may link to image projector 12 via image-rendering device 14 wirelessly. Usually, the user who is presenting or the active presenter must release or exit from the currently active presentation to enable a second presenter to begin sending data to device 14 for presentation.

It should be understood that any suitable computer or computing device that is capable of wirelessly linking to the local area network and conveying an image, or the URI or other indicator of the location of an image, to device 14 may be used in the present invention. Computers, as used herein, include, but are not limited to, desktop computers, handheld computers, laptop computers, servers, mainframes, telephones, etc.

Figure 5:
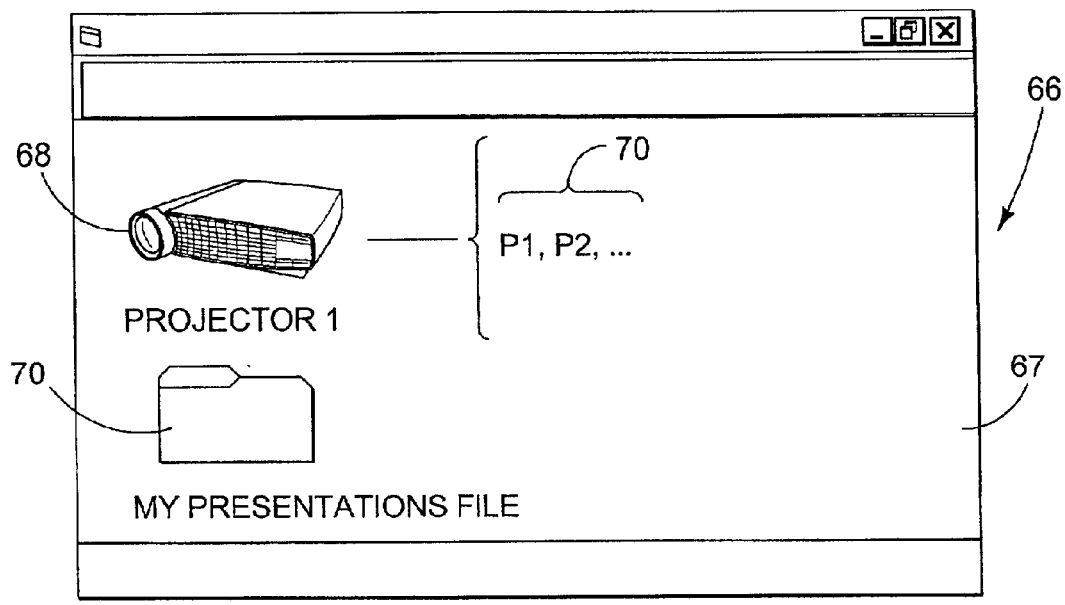
FIG. 5 is a representative user interface for the system depicted in FIG. 1, showing a projector selection window.

Device 14 enables the transfer of data to image projector 12 by connecting a user's computer with an image projector. In some embodiments, device 14 may communicate the name of the projector to which it is coupled to the user's computer. Thus, when a user connects to a network on which the projector is located, the project may appear as an icon, or be added to a list of projectors to which the computer may be connected. In this situation, the user may select the projector from the list of projectors to connect to a specific image projector. An exemplary user interface is shown in FIG. 5. The exemplary user interface includes a selection window 66 for display on a computer screen 67, but other formats are possible. The user interface includes a projector icon 68. Such an icon may be used to identify the projector that is currently available on the network. For example, and as shown in FIG. 5, "Projector 1" is linked to the user's computer via device 14. Alternatively, a user may be able to select the desired projector from a list of projectors 70.

The user interface also may include a presentations file 72 configured to allow a user to store presentations or images for display. When a user desires to present a presentation, a local wireless network card may be inserted into image receiver 24 within image-rendering device 14. The name or identifier for the linked projector may then be broadcasted to the user's computer indicating that the user can connect to the image projector and send images and/or presentations to device 14. The user may then select a presentation from presentation file 72 and direct it to the linked projector via projector icon 68. The user does not need to physically move his/her computer next to image projector 12, nor does the user have to plug adapters or cables into his/her computer to connect to the image projector. Instead, the user simply connects to the wireless network and directs a desired image or presentation to the projector. The user may remain seated the entire time and does not need to move to a position near the projector when presenting.

As discussed above, images may be transmitted from a user's computer to device 14 in many different formats. For example, an image file corresponding to the appearance of the display on the user's computer (screen shots or scrapes) may be sent to device 14. Typically, the screen shots will be sent to device 14 in a compressed form and decompressed at the device. Alternatively, uncompressed data may be sent to device 14. The type of compression may depend on the type of image. For example, photographic images may be compressed with a compressor suited for low spacial frequencies, while text may be compressed with a compressor suited for high spacial frequencies.

The use of screen-scraping may have some inherent limitations regarding graphics capabilities when sending screen shots to image-rendering device 14. Specifically, bandwidth limitations may hinder the ability to rapidly transmit and render complex and/or dynamic graphics to the image projector. Similarly, animations may be difficult to present using the screen-scraping format.

Image data may be transferred in other formats using a reduced amount of transmission bandwidth. For example, images on the user's computer may be reduced into graphic primitives, which are much smaller files than the screen shots, and then transmitted to image-rendering device 14. Sending graphic primitives will minimize the bandwidth requirements. For example, the presentations may be reduced into a compressed video formats, including, but not limited to, web standards developed by the World Wide Web Consortium (W3C), e.g. scalable vector graphics (SVG), Dynamic Hypertext Markup Language (DHTML), Extensible Markup Language (XML) or XML-like formats, Synchronized Multimedia Integration Language (SMIL™), etc. It also should be noted that non-W3C formats also may be used, including Vector Markup Language (VML), etc. Corresponding software may be included on image-rendering device 14, such that the images may be rendered and displayed on image projector 12.

Exemplary methods suitable for use with the present invention, for wirelessly transmitting images to an image projector are further disclosed in co-pending U.S. patent application Ser. No. 09/877,909 entitled "METHOD AND APPARATUS FOR WIRELESS IMAGE TRANSMISSION TO A PROJECTOR" filed Jun. 7, 2001 by Slobodin, Hoeye, Olson, Long, Girardelli and Duffy, the disclosure of which is hereby incorporated by reference.

It should be noted that in some embodiments, the user's computer may send the image data directly to image-rendering device 14. Alternatively, the user computer may send a universal resource indicator (URI) to image-rendering device 14, which directs device 14 to the appropriate location to pick up the desired image/presentation.

Image-rendering device 14 also may provide for the capability of a user to control aspects of the presentation via a control device connected to the image projector. For example, image projector 12 may include a remote control or other user device to enable a presenter to control the image projector. In this case, device 14 may send instructions entered into the remote control or other device to the user's computer. Such a configuration allows a user to control the computer via the remote control device.

As discussed above, a wired network card 30 also may be received within image receiver 24. Use of wired network card 30 enables image-rendering device 14 to be physically connected to the user's computer via a wired interface. Thus, when wired network card 30 is retained within slot 28, any one of the computers 56, 58, 60, 62, 64 illustrated in FIG. 4 may be linked to image-rendering device 14 by connecting the computer to the same network, through a physical connection, such as a cable or fiber optic connection. It will be appreciated that a wired network card may be permanently integrated within image-rendering device 14 without departing from the scope of the present invention.

The use of a wired network card within image-rendering device 14 enables a user to link into any suitable network, including, but not limited to, a local area network (LAN) or a wide area network (WAN), public (e.g. the Internet) or private networks, etc. In one application, a user may use the image-rendering device to browse the Internet. For example, the user may locate presentations and select the desired presentation using a remote device or other suitable user device linked to image projector 12. In another application, image-rendering device 14 may act as a client, e.g. a thin client, wherein the user computer provides the server software and the image-rendering device provides the client software. In such an application, the bulk of the processing may occur on the user computer. Furthermore, the wired network card may enable a remote server to provide the presentation via a client/server session between the image-rendering device and the remote server.

Figure 6:
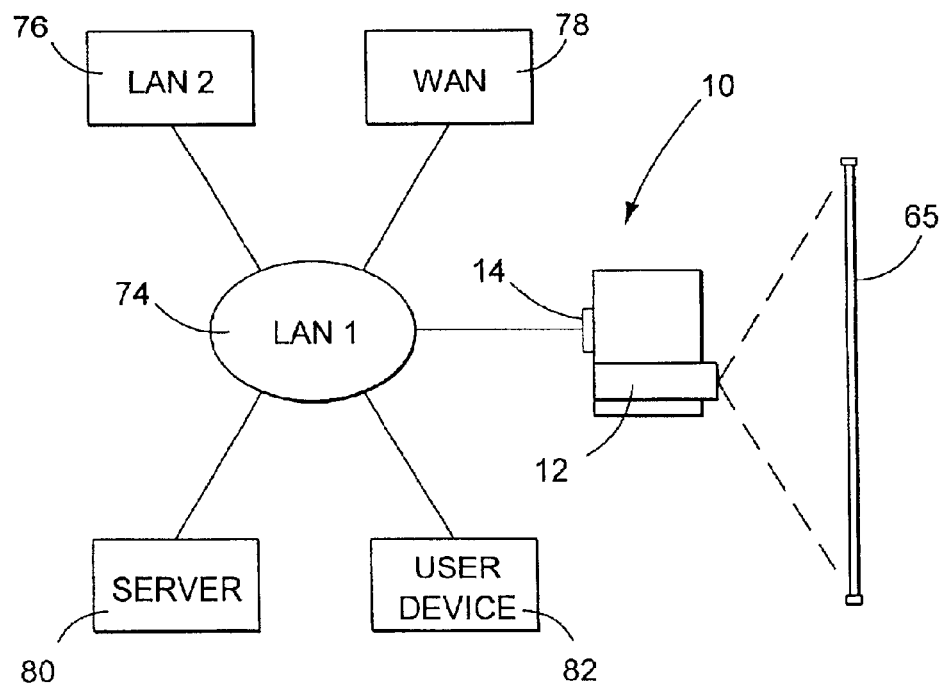
FIG. 6 is a schematic diagram of another exemplary use environment in which an embodiment of the present invention may be implemented.

An exemplary network environment in which the present invention may be implemented is shown in FIG. 6. As illustrated, image-rendering device 14 may be connected directly to a LAN 74 via a wired and/or wireless network card. Image-rendering device 14 may be further linked to a second LAN 76 and/or a WAN 78, such as the Internet, through LAN 74. Image-rendering device 14 also may be able to connect to a remote server 80 or user 82 via LAN 74. Such a configuration may enable a user to run a presentation on image projector 12 from a remote location.

It should be noted that image-rendering device 14 is compact and portable. Typically, image-rendering device 14 is much smaller and lighter than a conventional laptop. Moreover, no user input device, such as a keyboard or mouse, is necessary. The device is an automatic rendering engine configured to automatically render and transmit images from a first source to an image projector for display.

While various alternative embodiments and arrangements of an image display system have been shown and described above, it will be appreciated by those of skill in the art that numerous other embodiments, arrangements and modifications are possible and are within the scope of the invention. For example, it should be noted that image-rendering device 14 may be detachable from image projector 12 or permanently integrated within image projector 12. Moreover, image-rendering device 14 may include multiple image receivers 24 and/or a plurality of peripheral device connectors 36.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding, two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. An image-rendering device for an image projector, the device comprising:
   a body comprising:
      an image receiver adapted to alternatively receive a first interchangeable data transfer device and a second interchangeable data transfer device, wherein each interchangeable data transfer device is adapted to enable transfer of an image to the image-rendering device;
      a projector connector adapted to physically couple the image-rendering device to the image projector; and
      a processor configured to automatically transmit the image from the image receiver to the image projector for display.

2. The image-rendering device of claim 1, wherein the body is configured to be selectively inserted at least partially within an attachment slot in the image projector.

3. The image-rendering device of claim 1, wherein the image receiver is configured to receive a wireless local area network card.

4. The image-rendering device of claim 1, wherein the image receiver is configured to receive a wired network card.

5. The image-rendering device of claim 1, wherein the image receiver is configured to receive a presentation card.

6. The image-rendering device of claim 1, wherein the image receiver is configured to receive a mass storage device.

7. The image-rendering device of claim 6, wherein the image receiver is configured to receive a memory card.

8. The image-rendering device of claim 1, wherein the processor is further configured to decompress the image.

9. The image-rendering device of claim 1, further comprising a peripheral device connector configured to enable at least one peripheral device to be operably linked to the device, the peripheral device connector further configured to enable an image to be transferred from the peripheral device to the rendering device, or vice versa.

10. The image-rendering device of claim 9, wherein the at least one peripheral device is a digital camera.

11. The image-rendering device of claim 9, wherein the at least one peripheral device is a scanner.

12. The image-rendering device of claim 9, wherein the at least one peripheral device is a printer.

13. The image-rendering device of claim 1, wherein the projector connector is a video plug adapted to directly couple the device to a projector.

14. A portable image-rendering device for an image projector, the device comprising:
   a wireless receiver adapted to link the image-rendering device to a wireless network, the wireless receiver further adapted to receive an image from any one of a plurality of computers linked to the wireless network;
   a projector connector adapted to physically couple the image-rendering device to an image projector; and
   a processor configured to automatically transmit the image from the wireless receiver to the image projector for display.

15. The portable image-rendering device of claim 14, wherein the wireless receiver is adapted to receive a wireless network card.

16. The portable image-rendering device of claim 14, wherein the wireless receiver includes an integral wireless network card.

17. The portable image-rendering device of claim 14, further including an image receiver incorporating the wireless receiver, wherein the image receiver is adapted to alternatively receive a first interchangeable data transfer device and a second different interchangeable data transfer device.

18. The portable image-rendering device of claim 14, further comprising a peripheral device connector configured to enable at least one peripheral device to be operably linked to the device, the peripheral device connector further configured to receive an image and transfer the image from the at least one peripheral device to the rendering device, or vice versa.

19. The portable image-rendering device of claim 18, wherein the at least one peripheral device is a digital camera.

20. The portable image-rendering device of claim 18, wherein the at least one peripheral device is a scanner.

21. The portable image-rendering device of claim 18, wherein the at least one peripheral device is a printer.

22. The portable image-rendering device of claim 14, wherein the wireless receiver is adapted to receive graphic primitives and the device is configured to render the graphic primitives into projectable images.

23. The portable image-rendering device of claim 14, wherein the wireless receiver is adapted to receive compressed images and the device is configured to decompress the images into projectable images.

24. A portable image-rendering device for an image projector comprising:
   a peripheral device connector configured to enable at least one peripheral device to be operably linked to the device, the peripheral device connector further configured to receive an image from the at least one peripheral device;
   a projector connector adapted to physically couple the image-rendering device to an image projector; and
   a processor configured to automatically transmit the image from the at least one peripheral device to the image projector for display.

25. The portable image-rendering device of claim 24, wherein the at least one peripheral device is a camera.

26. The portable image-rendering device of claim 24, wherein the at least one peripheral device is a scanner.

27. The portable image-rendering device of claim 24, wherein the device is further configured to transfer an image displayed by the image projector to the at least one peripheral device.

28. The portable image-rendering device of claim 27, wherein the at least one peripheral device is a printer.

29. The portable image-rendering device of claim 24, further comprising an image receiver adapted to alternatively receive a first interchangeable data transfer device and a second interchangeable data transfer device, wherein each interchangeable data transfer device is adapted to enable transfer of an image to the image-rendering device.

30. An image display system comprising:
   an image projector adapted to display an image; and
   a portable image-rendering device having a body adapted to be physically coupled with the image projector and having an image source receiver configured to receive an image from an independent source, wherein the image-rendering device is further configured to automatically render the image from the independent source and to transfer the image to the image projector.

31. The image display system of claim 30, wherein the image projector includes a slot adapted to at least partially receive the body of the image-rendering device.

32. The image display system of claim 30, wherein the independent source is a remote computer linked to the device via a wireless network.

33. The image display system of claim 30, wherein the independent source is an interchangeable data transfer device.

34. The image display system of claim 31, wherein the image source receiver includes a slot adapted to receive an interchangeable data transfer device.

35. The image display system of claim 34, wherein the interchangeable data transfer device is a network card.

36. The image display system of claim 30, wherein the image-rendering device further includes a peripheral device connector configured to enable at least one peripheral device to be operably linked to the device, the peripheral device connector further configured to receive an image from the peripheral device and transfer the image to the image projector and vice versa.

37. An image-rendering device to convert how images are transmitted to an image projector, the image-rendering device comprising:
   a body configured to be removably attached to an image projector; and
   a slot within the body to removably receive a data transfer device that is configured to establish a wireless network that enables communication between the image-rendering device and independent sources, wherein the receipt of the data transfer device enables image transfer without physically connecting the independent sources to the image projector.

38. The image-rendering device of claim 37, wherein the data transfer device is a wireless network card.

39. The image-rendering device of claim 37, wherein the data transfer device is adapted to enable transmission from the independent sources regardless of computing platform of the independent sources.

* * * * *